(12) United States Patent
Frey et al.

(10) Patent No.: US 11,667,848 B2
(45) Date of Patent: Jun. 6, 2023

(54) POWER RECOVERY FROM QUENCH AND DILUTION VAPOR STREAMS

(71) Applicant: UOP LLC, Des Plaines, IL (US)

(72) Inventors: Stanley Joseph Frey, Palatine, IL (US); Keith Allen Couch, Arlington Heights, IL (US); Donald A. Eizenga, Elk Grove Village, IL (US); James W. Harris, Palatine, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 17/038,139

(22) Filed: Sep. 30, 2020

(65) Prior Publication Data

US 2021/0009904 A1     Jan. 14, 2021

Related U.S. Application Data

(62) Division of application No. 15/924,037, filed on Mar. 16, 2018, now Pat. No. 10,829,698.

(51) Int. Cl.
    *C10G 11/18*      (2006.01)
    *F22B 1/18*      (2006.01)
    (Continued)

(52) U.S. Cl.
    CPC ............ *C10G 11/187* (2013.01); *C10G 11/18* (2013.01); *C10G 45/72* (2013.01); *C10G 47/36* (2013.01);
    (Continued)

(58) Field of Classification Search
    CPC ..... C10G 11/18; C10G 11/182; C10G 11/185; C10G 11/187; C10G 47/30; C10G 47/36;
    (Continued)

(56) References Cited

U.S. PATENT DOCUMENTS

| | | |
|---|---|---|
| 4,285,481 A | 8/1981 | Biscomb |
| 4,455,614 A | 6/1984 | Martz et al. |

(Continued)

FOREIGN PATENT DOCUMENTS

| | | |
|---|---|---|
| CN | 102203780 A | 9/2011 |
| CN | 103917280 A | 7/2014 |

(Continued)

OTHER PUBLICATIONS

Tsourapas, Vasilios, Control Analysis of Integrated Fuel Cell Systems with Energy Recuperation Devices, 2007.

(Continued)

*Primary Examiner* — Mark A Laurenzi
*Assistant Examiner* — Xiaoting Hu

(57) ABSTRACT

A process for reducing pressure of a vapor stream used for reducing a temperature or pressure in a reactor. A pressure of a vapor stream is reduced with a turbine to provide a lower pressure vapor stream. The vapor stream rotates a turbine wheel within the turbine. The turbine wheel is configured to transmit rotational movement to an electrical generator. Thus, electricity is generated with the turbine. The lower pressure vapor stream is injected into a reactor and reduces a temperature in the reactor or reduces a partial pressure of a hydrocarbon vapor in the reactor.

4 Claims, 3 Drawing Sheets

(51) Int. Cl.
F22B 3/02 (2006.01)
C10G 45/72 (2006.01)
C10G 47/36 (2006.01)
F02C 6/00 (2006.01)
F02C 1/04 (2006.01)
F01K 17/04 (2006.01)

(52) U.S. Cl.
CPC ............... *F01K 17/04* (2013.01); *F02C 1/04* (2013.01); *F02C 6/00* (2013.01); *F22B 1/1838* (2013.01); *F22B 3/02* (2013.01); *C10G 2300/4012* (2013.01); *F05D 2220/62* (2013.01)

(58) Field of Classification Search
CPC .................. C10G 45/20; C10G 45/72; C10G 2300/4012; F05D 2220/62; F22B 1/1838; F01K 17/00; F01K 17/04; F02C 6/00
See application file for complete search history.

(56) References Cited

U.S. PATENT DOCUMENTS

| | | | |
|---|---|---|---|
| 5,384,489 A | 1/1995 | Bellac | |
| 6,009,711 A | 1/2000 | Kreiger et al. | |
| 6,265,453 B1 | 7/2001 | Kennedy | |
| 6,354,084 B1 | 3/2002 | McKinley et al. | |
| 6,681,155 B1 | 1/2004 | Fujita et al. | |
| 6,898,540 B2 | 5/2005 | Davies | |
| 6,962,199 B1 | 11/2005 | Willink | |
| 7,757,493 B2 * | 7/2010 | Bell | F02C 3/205 60/775 |
| 7,948,101 B2 | 5/2011 | Burtch | |
| 8,404,918 B2 | 3/2013 | Frey | |
| 8,510,015 B2 | 8/2013 | Beausoleil et al. | |
| 8,763,625 B1 | 7/2014 | Carter | |
| 8,967,590 B2 | 3/2015 | Minervini et al. | |
| 9,085,499 B2 | 7/2015 | Frey et al. | |
| 9,235,228 B2 | 1/2016 | Gazit et al. | |
| 9,764,272 B2 | 9/2017 | Martin et al. | |
| 10,508,568 B2 | 12/2019 | Frey et al. | |
| 10,690,010 B2 | 6/2020 | Harris et al. | |
| 10,745,631 B2 | 8/2020 | Frey et al. | |
| 10,753,235 B2 | 8/2020 | Harris et al. | |
| 10,794,225 B2 | 10/2020 | Frey et al. | |
| 2005/0034463 A1 | 2/2005 | Simpson et al. | |
| 2008/0015839 A1 | 1/2008 | Noureldin et al. | |
| 2009/0125152 A1 | 5/2009 | Skowronski et al. | |
| 2011/0077448 A1 | 3/2011 | Frey | |
| 2011/0100004 A1 | 5/2011 | Al-Mazeedi | |
| 2012/0107227 A1 | 5/2012 | Fischer et al. | |
| 2012/0118526 A1 | 5/2012 | Sudau et al. | |
| 2012/0227440 A1 | 9/2012 | Guidati et al. | |
| 2012/0245754 A1 | 9/2012 | Mehnert | |
| 2012/0260667 A1 | 10/2012 | Chillar et al. | |
| 2012/0326443 A1 * | 12/2012 | Vince | F03B 15/00 290/7 |
| 2013/0199185 A1 | 8/2013 | Wain et al. | |
| 2014/0291201 A1 | 10/2014 | Banerjee et al. | |
| 2014/0331672 A1 | 11/2014 | Filippi et al. | |
| 2015/0060331 A1 | 3/2015 | Sechrist et al. | |
| 2015/0107252 A1 * | 4/2015 | Okaichi | F01D 17/24 60/660 |
| 2015/0118131 A1 | 4/2015 | Martin et al. | |
| 2015/0291895 A1 | 10/2015 | Qafisheh et al. | |
| 2016/0079756 A1 | 3/2016 | Ikeyama et al. | |
| 2016/0141878 A1 | 5/2016 | Johansen | |
| 2016/0161536 A1 | 6/2016 | Amminudin | |
| 2016/0252015 A1 | 9/2016 | Kusumi et al. | |
| 2016/0319198 A1 | 11/2016 | Quanci et al. | |
| 2017/0058206 A1 | 3/2017 | Noureldin et al. | |
| 2017/0058207 A1 | 3/2017 | Noureldin et al. | |

FOREIGN PATENT DOCUMENTS

| | | |
|---|---|---|
| CN | 104463341 A | 3/2015 |
| CN | 206538206 | 10/2017 |
| EP | 0552039 | 7/1993 |
| EP | 2778354 A1 | 9/2014 |
| FR | 2414162 | 8/1979 |
| RU | 2014114067 | 10/2015 |
| WO | 2014119569 A1 | 8/2014 |
| WO | 2014178079 A2 | 11/2014 |
| WO | 2016004014 A1 | 1/2016 |
| WO | 2016177376 A1 | 11/2016 |

OTHER PUBLICATIONS

The Elliot Group, Maximize the Efficiency of your Steam Process, 2014.
U.S. Department of Energy, Replace Pressure-Reducing Valves with Backpressure Turbogenerators.
Mechanical Solutions, Inc., Replacing a Pressure Reducing Valve with a Hydro Turbine for a Municipal Water Supply, Jul. 19, 2016.
Robinson, Paul R. et al. "Hydrotreating and Hydrocracking: Fundamentals", 2007.
The Engineering Toolbox, "Mixing Fluids", 2011.
International Search Report from PCT Application No. PCT/US2019/022422, dated May 23, 2019.
Mohammadzadeh, Ashkan et al., Design of a wind turbine model for clean energy. Case study: Khorasan Razavi regional electricity company, Acta Technica, 62, No. 4B/2017-1-8.
Guitiérrez-Antonio, Claudia, et al., Intensification of the hydrotreating process to produce renewable aviation fuel through reactive distillation, Science Direct, vol. 124, Feb. 2018.
Frey, Stanley J., et al., U.S. Appl. No. 15/923,945, filed Mar. 16, 2018 and entitled "Consolidation and Use of Power Recovered from a Turbine in a Process Unit".
Frey, Stanley J., et al., U.S. Appl. No. 16/357,001, filed Mar. 18, 2019 and entitled "System for Consolidation and Use of Power Recovered from a Turbine in a Process Unit".
Frey, Stanley J., et al., U.S. Appl. No. 16/355,191, filed Mar. 15, 2019 and entitled "System for Power Recovery from Quench and Dilution Vapor Streams".
Frey, Stanley Joseph, et al., U.S. Appl. No. 15/923,997, filed Mar. 16, 2018 and entitled "Processes for Adjusting at Least One Process Condition of a Chemical Processing Unit with a Turbine".
Frey, Stanley J., U.S. Appl. No. 15/923,936, filed Mar. 16, 2018 and entitled "Energy-Recovery Turbines for Gas Streams".

* cited by examiner

POWER RECOVERY FROM QUENCH AND DILUTION VAPOR STREAMS

RELATED APPLICATIONS

This application is a Divisional Application of U.S. application Ser. No. 15/924,037 filed on Mar. 16, 2018, the entirety of which is incorporated herein by reference.

FIELD OF THE INVENTION

This invention relates generally to vapor streams that are used in a chemical processing or refining plant as a dilution fluid or a quench fluid, and more particularly to processes wherein such vapor streams pass through a turbine to lower a pressure of the vapor stream and recover energy from the pressure reduction.

BACKGROUND OF THE INVENTION

Chemical refining and processing methods frequently utilize diluent or quench fluids which added to help promote reaction(s) and/or control temperature(s). Exemplary reactors that utilize these types of vapor streams include petroleum refining fluidized catalytic cracking "FCC" reactors and hydroprocessing reactors. In reactors, the lowest temperature of the diluent or quench vapor streams is occasionally limited by the dew point of the vapor stream.

In an FCC reactor, steam is added to the transport reactor to transport catalyst, as a working fluid for feed atomization and distribution, as a stripping media to remove hydrocarbons from the catalyst prior to regeneration and to reduce the partial pressure of the lower molecular weight products thereby relieving equilibrium for cracking and promoting higher conversion. Steam is used commonly for dilution in process operations often to reduce the partial pressure of hydrocarbon to promote vaporization or forward reaction in mole generating reactions as in FCC. The use of steam is to provide a gaseous material that is easily condensed and removed after its use. Many times, in the case of FCC, it is advantageous to have the steam as close to dew point as possible since the added energy is detrimental to the performance of the unit. The flow of hot catalyst added to the reactor is limited by maximum reactor temperatures promoting thermal cracking. Due to the usually high pressure drop from steam supply to the reactor riser, the steam enters with a large amount of superheat unnecessarily producing a reactor temperature higher than what might be possible with a steam source with less superheat. This limits the hot catalyst circulation rate and tends to give more unwanted thermal cracking versus catalytic cracking.

In a hydroprocessing reactor, the catalyst beds are often separated into multiple beds due to the highly exothermic nature of hydroprocessing and the need to quench the reactions and control the temperature. Between the different reactor beds, a relatively low temperature (compared to the process) hydrogen-containing vapor stream is added to quench the reactor temperature before the process fluid enters the next bed catalyst. The use of the hydrogen-containing vapor stream requires energy as the quench stream is compressed. The hydroprocessing unit throughput is often limited by flow of quench hydrogen to keep the reactor catalyst bed temperatures in a safe range.

In either conventional hydroprocessing or FCC reactors, the quench or dilution streams often passes through a control valve to control the flow of these vapor streams. While these conventional systems are presumably effective for their intended purposes, the control valves result in a loss of mechanical energy. Specifically, since the energy removed, via the pressure reduction, is dissipated without recovery by the control valve, the energy is lost. Additionally, because the energy removed often is a result of energy added to the system, the lost energy can represent a higher operating cost. This lost energy results in minimal temperature reduction versus the pressure reduction via an adiabatic pressure reduction across the control valve.

Therefore, there is a need for an effective and efficient device and process for recovery of this lost energy associated with such quench or dilution vapor streams in addition to a method to shift more of the energy reduction to temperature reduction versus pressure reduction.

SUMMARY OF THE INVENTION

The present invention provides devices and processes that overcomes one or more shortcomings associated with the prior art.

Specifically, according to the present invention, the control valve is replaced with a turbine. By using a turbine, instead of control valve, the same or more energy removal to lower the pressure is achieved with a greater reduction in temperature following a more isentropic process than with a control valve. A turbine in the quench or dilution stream changes the reduction of pressure from an adiabatic operation (valve with hot outlet temperature) to an isentropic operation where energy is extracted in the way of work on a shaft thereby producing a lower temperature output while optionally generating power from the pressure let down. Alternatively, the energy could be dissipated by a brake or other device in case the electricity recovery is not valued highly versus the process improvement.

In the case of an FCC unit, having a dilution stream nearer its dew point will reduce the riser heat input allowing more heat to be added by increased catalyst circulation and providing more selective cracking to desired LPG and naphtha components. In the case of a hydroprocessing reactor, less hydrogen will be required in the quench vapor streams, resulting in lower energy use in the recycle gas compressor, and/or allowing more hydrogen to be injected into the inlet of the reactor—promoting longer first bed catalyst life and higher hydrogenation in each bed but the last. At fixed hydrogen flow, the cooler hydrogen allows more hydrocarbon charge to the reactor as more of the heat of reaction is cooled with the same flow of now cooler hydrogen. Additionally, in addition to the foregoing benefits, the turbines convert the removed energy into electrical energy to be utilized elsewhere. Thus, the turbines provide an additional advantage over the control valves currently used with the dilution and quench streams.

Therefore, in at least one aspect, the present invention may be characterized, as providing a process for reducing pressure of a vapor stream used for reducing a temperature, a heat load, or a hydrocarbon partial pressure in a reactor by: reducing a pressure of a vapor stream with a turbine to provide a lower pressure vapor stream; rotating a turbine wheel within the turbine; injecting the lower pressure vapor stream into a reactor in order to reduce a temperature or total heat injection to the reactor or reduce a partial pressure of a hydrocarbon vapor in the reactor.

In another aspect, the present invention may be characterized, as providing a process for reducing pressure of a vapor stream used for adjusting a partial pressure of a hydrocarbon vapor by: providing a vapor stream comprising steam; passing the vapor stream through a turbine, the turbine comprising a turbine wheel within the turbine, the turbine wheel optionally configured to transmit rotational movement to an electrical generator; recovering a reduced pressure vapor stream from the turbine; and, reducing a partial pressure of a hydrocarbon vapor by mixing the reduced pressure vapor stream with the hydrocarbon vapor.

Further, in yet another aspect, the present invention may be characterized, as providing a process for reducing pressure of a vapor stream used as a quench stream by: providing a vapor stream comprising hydrogen; passing the vapor stream through a turbine, the turbine comprising a turbine wheel within the turbine, the turbine wheel optionally configured to transmit rotational movement to an electrical generator; recovering a reduced pressure vapor stream from the turbine; and, controlling a temperature within a reactor with the reduced pressure vapor stream from the turbine.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing figures in which.

DETAILED DESCRIPTION OF THE INVENTION

As mentioned above, the present utilizes one or more turbines to reduce the pressure and temperature through a nearly isentropic means and optionally recover energy from a quench or dilution vapor stream in a chemical processing unit. The optionally recovered energy, in the form of electrical energy, is, for example, used elsewhere in the processing unit. It is contemplated that power recovery turbines are installed on these high-power let downs of hydrogen and steam into the reactors thereby generating value from the energy recovered in addition to increasing reactor conversion or throughput and reducing specific product energy intensity by allowing a lower hydrogen circulation rate, higher feed rate (throughput), or increased conversion.

With these general principles in mind, one or more embodiments of the present invention will be described with the understanding that the following description is not intended to be limiting.

Figure 1:
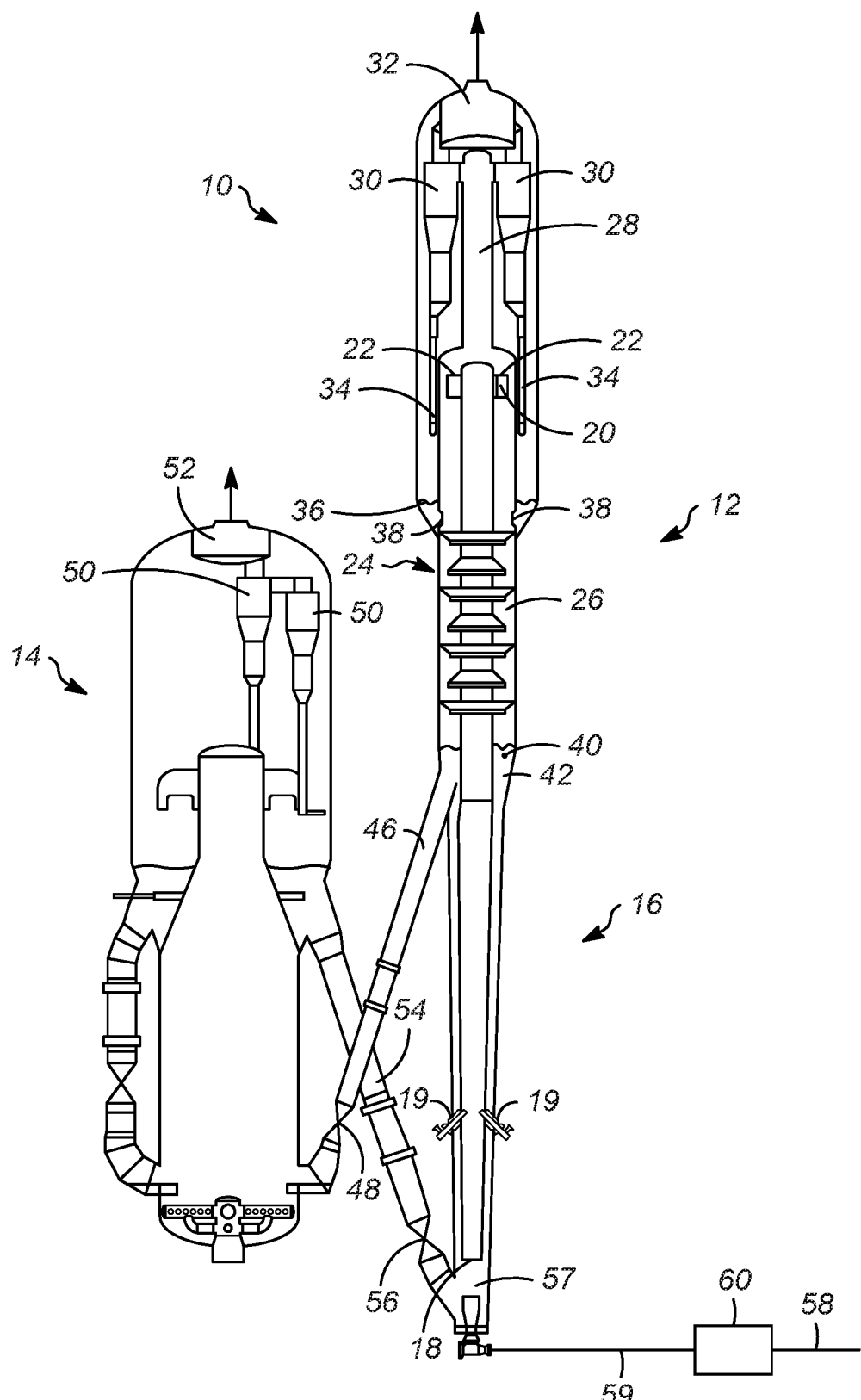
FIG. 1 shows an FCC reactor used in accordance with one or more embodiments of the present invention.

Turning to FIG. 1, in various aspects of the present invention, the turbine is used in a dilution stream associated with an FCC unit 10. The description of this invention in the context of the specific FCC unit 10 shown is not meant to limit the present invention to the details disclosed therein.

The FCC unit 10 shown in FIG. 1 includes, generally, a separator vessel 12, a regenerator 14, and a vertical riser 16. The FCC unit 10 circulates catalyst and contacts feed in the manner hereinafter described.

The catalyst comprises any of the well-known catalysts that are used in the art of fluidized catalytic cracking, such as an active amorphous clay-type catalyst and/or a high activity, crystalline molecular sieve. Molecular sieve catalysts are preferred over amorphous catalysts because of their much-improved selectivity to desired products. Zeolites are the most commonly used molecular sieves in FCC processes. Preferably, the first catalyst comprises a large pore zeolite, such as an Y-type zeolite, an active alumina material, a binder material, comprising either silica or alumina and an inert filler such as kaolin. A catalyst additive may comprise a medium or smaller pore zeolite catalyst exemplified by ZSM-5, ZSM-11, ZSM-12, ZSM-23, ZSM-35, ZSM-38, ZSM-48, and other similar materials.

FCC feedstocks include conventional FCC feeds and higher boiling or residual feeds. The most common of the conventional feeds is a vacuum gas oil which is typically a hydrocarbon material having a boiling range of from 343° to 552° C. (650° to 1025° F.) and is prepared by vacuum fractionation of atmospheric residue. Heavy or residual feeds, i.e., boiling above 499° C. (930° F.), are also suitable.

Looking then at FIG. 1, the riser 16 provides a conversion zone for cracking of hydrocarbons in the feedstock. The residence time for the feed in contact with the catalyst in the riser 16 may be less than or equal to 3 seconds. Any residence time of less than or equal to 3 seconds may be preferred depending on the desired product distribution. The shorter residence time assures that the desired products once obtained do not convert to undesirable products. Notwithstanding the foregoing, different residence times may be utilized as will be appreciated by those of ordinary skill in the art.

The feedstock is introduced into the riser 16 by one or more distributors or nozzles 19 between an inlet 18 to the riser 16 and substantially upstream from an outlet 20. Volumetric expansion resulting from the rapid vaporization of the feedstock as it enters the riser 16 further decreases the density of the catalyst within the riser to typically less than 160 kg/m$^3$ (10 lb/ft$^3$). Before contacting the catalyst, the feedstock will ordinarily have a temperature in a range of from 149° to 316° C. (300° to 600° F.). Additional amounts of feedstock may be added downstream of the initial feed point of the distributors 19.

The blended catalyst and reacted feed vapors are then discharged from the top of riser 16 through the outlet 20 and separated into a cracked product vapor stream including olefins and a collection of catalyst particles covered with substantial quantities of coke and generally referred to as "coked catalyst." In an effort to minimize the contact time of the feedstock and the catalyst which may promote further conversion of desired products to undesirable other products, any arrangement of separators to remove coked catalyst from the product stream quickly is used.

In particular, a swirl arm arrangement 22, provided at the end of riser 16 can further enhance initial catalyst and cracked hydrocarbon separation by imparting a tangential velocity to the exiting catalyst and cracked product vapor stream mixture. Such swirl arm arrangements 22 are more fully described in U.S. Pat. No. 4,397,738. The swirl arm arrangement 22 is located in an upper portion of a chamber 24, and a stripping zone 26 is situated in the lower portion of the chamber 24. Catalyst separated by the swirl arm arrangement 22 drops down into the stripping zone 26 (discussed below). The cracked product vapor stream comprising cracked hydrocarbons including light olefins and some catalyst pass, via conduit 28, to cyclones 30. The cyclones 30 remove remaining catalyst particles from the product vapor stream to reduce particle concentrations to very low levels. The product vapor stream then exits the top of the separating vessel 12 through an outlet 32. Catalyst separated by the cyclones 32 return to separating vessel 12 through dipleg conduits 34 into dense bed 36 where it will enter the stripping zone 26 through openings 38.

The stripping zone 26 removes adsorbed hydrocarbons from the surface of catalyst by counter-current contact with steam. The steam enters stripping zone 26 through line 40. Any hydrocarbons removed in the stripping some 26 will flow upwards as described above. The catalyst will drop to a catalyst bed 42 at the bottom of the chamber 24.

Some catalyst from the catalyst bed 42 may be recycled to the riser 16 without first undergoing regeneration. A second portion of the catalyst from the catalyst bed 42 is regenerated in the regenerator 14 before it is returned to the riser 16. The second portion of the of the catalyst from the catalyst bed 42 is transported to the regenerator 14 through a coked catalyst conduit 46 at a rate regulated by control valve 48 for the removal of coke.

On the regeneration side of the process, coked catalyst transferred to the regenerator 14 via the coked catalyst conduit 46 undergoes the typical combustion of coke from the surface of the catalyst particles by contact with an oxygen-containing gas. The oxygen-containing gas enters the bottom of regenerator 14 via an inlet 48 and passes through a dense fluidizing bed of catalyst (not shown). Flue gas consisting primarily of carbon dioxide and perhaps containing carbon monoxide passes upwardly from the dense bed into a dilute phase of regenerator 14. A separator, such as cyclones 50 or other means, remove entrained catalyst particles from the rising flue gas before the flue gas exits the regenerator 14 through an outlet 52. The combustion of coke from the catalyst particles raises the temperatures of the catalyst which is withdrawn from the regenerator 14 in a regenerator standpipe 54.

The regenerator standpipe 54 passes regenerated catalyst from the regenerator 14 into a blending zone 57 at a rate regulated by control valve 56. The flow rate of this catalyst is typically maximized to provide the highest conversion selective to desired gasoline and LPG products at the highest production rate. This catalyst provides most of the heat for the reactor and the flow is limited by the temperature in the riser. Therefore, anything that reduces the heat input to the riser allows for higher catalyst circulation rates, and higher conversions or higher feed rates.

In the blending zone 57, the regenerated catalyst is blended with catalyst directly from the catalyst bed 42. A fluidizing gas is passed into the blending vessel 56 from a conduit 58. The fluidizing gas contacts the catalyst and maintains the catalyst in a fluidized state to rise within the riser 16 and contact the feedstock as described above. Often times, the fluidizing gas is steam. In addition to fluidizing the catalyst, the steam reduces the partial pressure of the hydrocarbons in the riser 16, and helps drive the catalyzed reactions towards desired products (as opposed to undesired byproducts).

In conventional FCC units, a control valve is used to lower the pressure of the steam in the conduit 58 prior to it being passed into the FCC unit 10. The present invention utilizes a turbine 60 in an isentropic expansion to lower the pressure of the steam in conduit 58 prior to passing the steam into the FCC unit 10 which would result in a lower energy content steam versus that controlled by an adiabatic process control valve. An exemplary turbine 60 is shown in FIG. 2.

Figure 2:
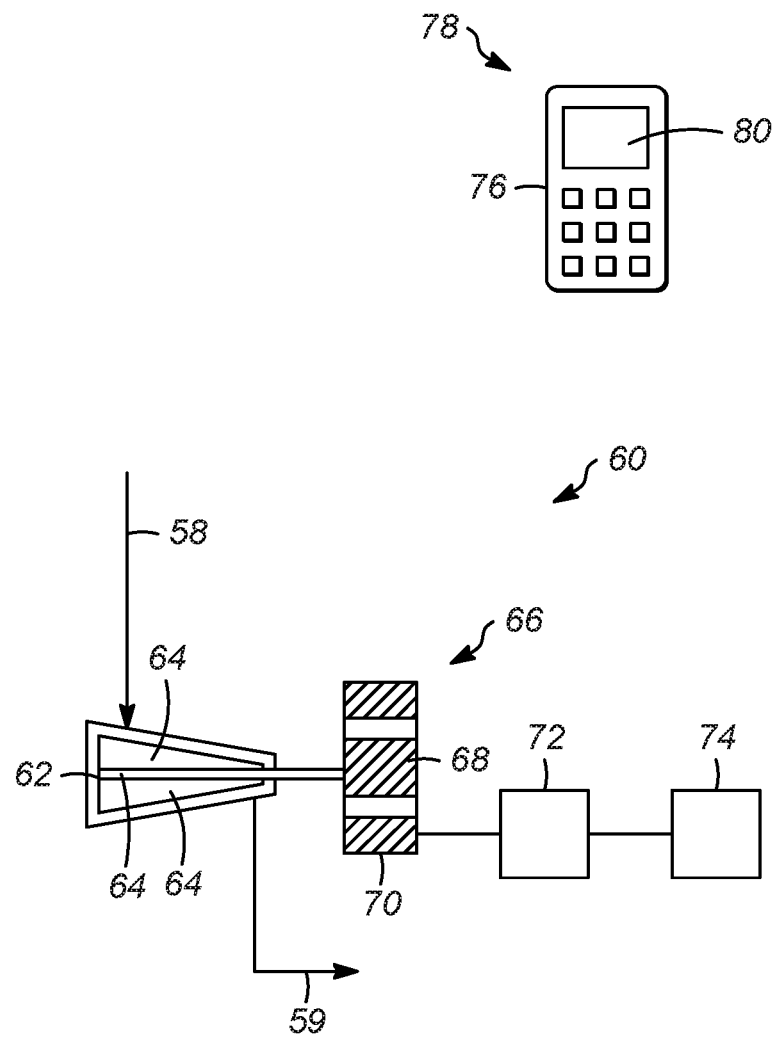
FIG. 2 shows a schematic drawing of a turbine according to one or more aspects of the present invention; and, FIG. 3 shows a hydroprocessing reactor used in accordance with one or more embodiments of the present invention.

Turning to FIG. 2, the turbine 60 includes a turbine wheel 62 with blades 64 configured to transfer, or transmit, rotational movement, created by the flow of the steam passed through the turbine wheel 62, to an electrical generator 66. The electrical generator 66 generally includes a first winding 68, in communication with the turbine wheel 62 and a second winding 70 surrounding the first winding 68. As is known, the rotation of the first winding 68 relative to the second winding 70 will generate an electrical current. Although not depicted as such, the electrical generator 66 could include a permanent magnet instead of one of the windings, 68, 70. Such electrical generators are known in the art.

Additionally, the turbine 60 may include a processor 72 configured to measure an amount of electricity generated by the turbine 60 and a transmitter 74 configured to transmit information associated with the amount of electricity generated by the turbine 60 to a computer 76 at a control center 78. The specific configuration of the turbine 60 is not essential to the practicing of the present invention provided that the turbine 60 allows for the desired pressure reduction and conversion of energy from the pressure reduction to electricity. Exemplary turbines and further details are described in U.S. Pat. Nos. 4,625,125, 4,694,189, 4,754,156 and 9,203,969, all of which are incorporated herein by reference.

Accordingly, in some embodiments, the process according to the present invention comprises directing a portion of a gaseous process stream through one or more variable-resistance turbines to control the flowrate of the gas process stream and, optionally, generate electric power therefrom; controlling a pressure and temperature of the gaseous process stream so that the gas exiting the power-recovery turbine remains in the gas phase; and measuring the flowrate or controlling the flowrate or both using a variable nozzle turbine, inlet variable guide vanes, or direct coupled variable electric load, to name a few, to vary the resistance to flow through the turbine. Again, the resistance to rotation of the variable-resistance turbine can be varied by an external variable load electric circuit which is in a magnetic field from a magnet(s) that is rotating on the turbine. As more load is put on the circuit, there is more resistance to rotation on the turbine. This in turn imparts more pressure drop across the turbine and slows the process stream flow. An algorithm in the device can also calculate the actual flow through the device by measuring the turbine RPMs and the load on the circuit. The resistance to rotation flow can also be varied by variable position inlet guide vanes. In some embodiments, the power will be generated via power-recovery turbines with variable resistance to flow made possible by either guide vanes or variable load on the electrical power generation circuit. An algorithm to calculate actual flow using the guide vanes position, power output and RPMs can be used.

Thus, the steam from conduit 58 will enter the turbine 60 at an inlet and rotate the turbine wheel 62, thereby reducing the pressure and temperature of the steam and extracting energy from the steam. The lower pressure steam 59, taken from the outlet of the turbine 60, is injected into the riser 16 and reduces a partial pressure of a hydrocarbon vapor in the riser 16. The desired temperature of the steam at the outlet of the turbine 60 is preferably within 15 degrees C. of the dew point of the reduced pressure steam. It is also contemplated that a turbine 60 is utilized in place of control valves in association with the nozzles 19 and/or with the line 40 for the stripping steam.

Figure 3:
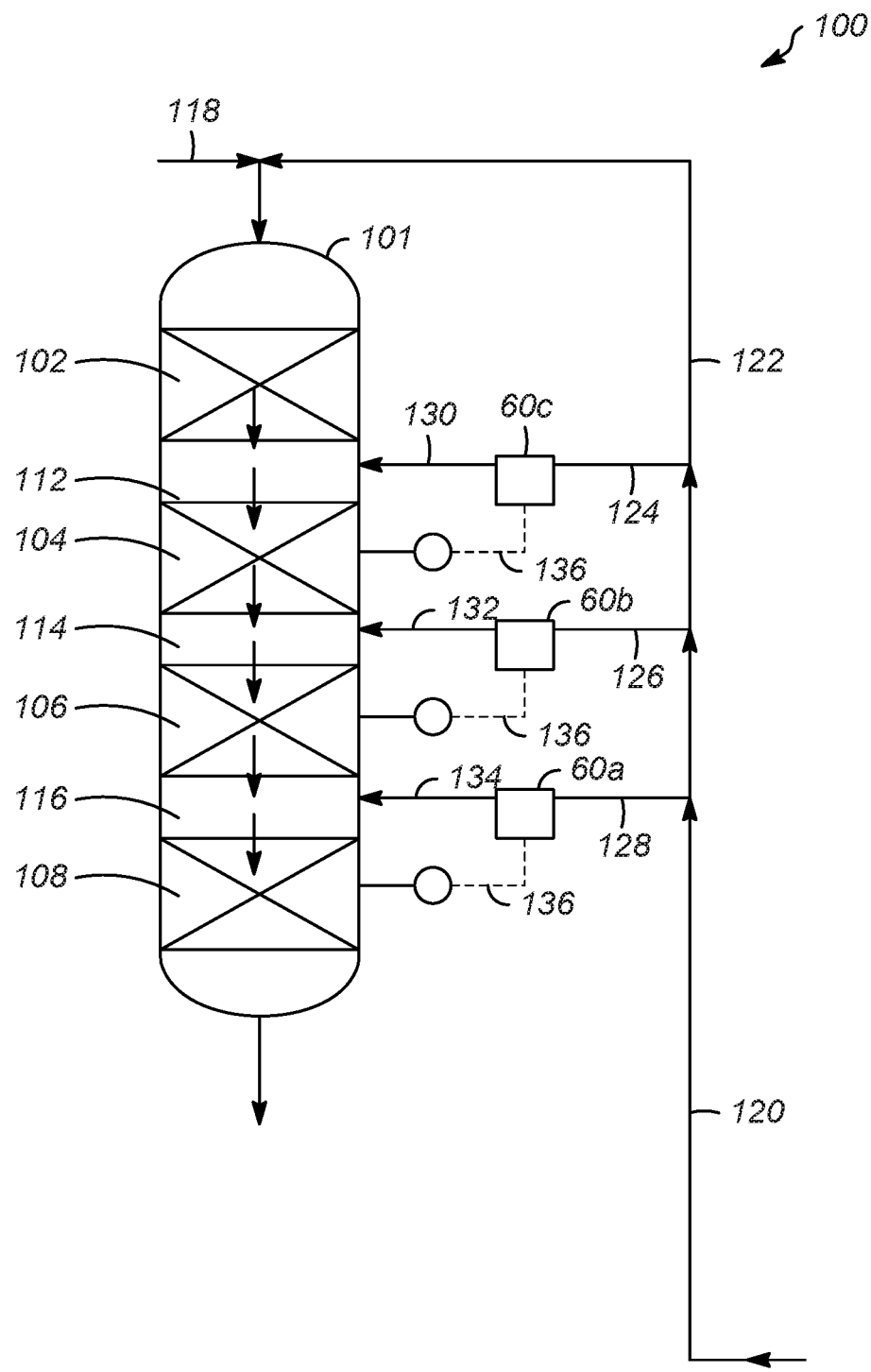

Turning to FIG. 3, it is also contemplated that a turbine is used in association with a quench stream, for example in a hydroprocessing reactor 100. As used herein, the term "hydroprocessing" can refer to processing one or more hydrocarbons in the presence of hydrogen, and can include hydrotreating and/or hydrocracking. As used herein, the term "hydrocracking" can refer to a process breaking or cracking bonds of at least one long-chain hydrocarbon in the presence of hydrogen and at least one catalyst into lower molecular weight hydrocarbons. As used herein, the term "hydrotreating" can refer to a process including contacting a hydrocarbon feedstock with hydrogen gas in the presence of one or more suitable catalysts for the removal of heteroatoms, such as sulfur, nitrogen and metals from a hydrocarbon feedstock. In hydrotreating, hydrocarbons with double and triple bonds may be saturated, and aromatics may also be saturated, as some hydrotreating processes are specifically designed to saturate aromatics.

As depicted in FIG. 3, a hydroprocessing reactor 100 that is used in accordance with the present invention is a multi-fixed bed vessel 101 which, as is known, comprises multiple catalyst beds 102, 104, 106, 108 that are separated from each other by pre-bed spaces 112, 114, 116 (also referred to as quench zones. In an exemplary embodiment, each of the catalyst beds 102, 104, 106, 108 contain a hydrotreating catalyst. Hydrotreating catalysts are well known and typically comprise molybdenum (Mo), tungsten (W), cobalt (Co), and/or nickel (Ni) on a support comprised of y-alumina. The particular type of hydrotreating catalyst is not necessary for the understanding or practicing of the present invention.

As illustrated, a feed stream 118 is introduced to the hydroprocessing reactor 100. While the feed stream 118 is depicted as being introduced at the top of the vessel 101, it is contemplated that the feed stream 118 is split and injected into the hydroprocessing reactor 100 at multiple positions, such as the pre-bed spaces 112, 114, 116.

A hydrogen-containing stream 120 is also split in a plurality of streams into hydrogen rich streams 122, 124, 126, 128. Preferably, the hydrogen-containing stream 120 is a Hz-rich stream. As used herein, the term "rich" means an amount generally of at least 50%, and preferably 70%, by volume, of a compound or class of compounds in a stream. The hydrogen-containing stream 120 may contain recycle hydrogen from the hydroprocessing reactor 100, make-up hydrogen, or a combination of recycle hydrogen and make-up hydrogen.

A first hydrogen rich stream 122 is combined with the feed stream 118 (before or after injection into the vessel 101). The remaining hydrogen rich streams 124, 126, 128 are used as quench streams 130, 132, 134 and injected into the pre-bed spaces 112, 114, 116 of the hydroprocessing reactor 100. In order to reduce the pressure of the quench streams 130, 132, 134, turbines 60a, 60b, 60c are used. These turbines 60a, 60b, 60c are, for example, the turbine 60 shown in FIG. 2. The turbines 60a, 60b, 60c may each be in communication with a temperature sensor 136 configured to measure a temperature of one of the pre-bed spaces 112, 114, 116 and relay the temperature to the turbines 60a, 60b, 60c to adjust the flow of the respective quench streams 130, 132, 134.

Thus, the hydrogen rich streams 124, 126, 128 will enter each of the turbines 60a, 60b, 60c and rotate turbine wheels therein (see, FIG. 2), thereby reducing the pressure and temperature of the hydrogen rich streams 124, 126, 128 and extracting energy from the hydrogen rich streams 124, 126, 128. The lower pressure and temperature quench streams 130, 132, 134 are injected into pre-bed spaces 112, 114, 116 of the reactor 100 and to control the temperature of the catalyst beds 104, 106, 108 within the reactor 100.

In both the FCC unit 10 and the hydroprocessing reactor 100, the flow rate of the stream coming from the turbine 60 can be adjusted to change a process condition of the FCC unit 10 and the hydroprocessing reactor 100. For example, the flow rate of the steam in the riser 16 is adjusted to allow for a change in the hydrocarbon partial pressure within the riser 16 and the catalyst circulation rate. Similarly, the flow rate of the quench streams 130, 132, 134 may be adjusted to change the temperature of the catalyst beds 104, 106, 108 within the reactor 100. Accordingly, in changing these process conditions, it is contemplated that the changes are "slow control" in which the desired change occurs at a relatively slow pace.

For example, with respect to the hydrotreating reactor 100, it is contemplated that a response time to reach half way (i.e., 50% of a difference) between a new (or target) temperature within the hydrotreating reactor 100 and an original (or starting) temperature within the hydrotreating reactor 100, when the new (or target) temperature differs from the original (or stating) temperature by at least 10%, is at least one second, or even greater, for example, ten seconds. In other words, when the new temperature of the reactor differs from the current temperature within the reactor, the turbine provides a process that takes at least one second, at least ten seconds, at least one minute, at least ten minutes, or an hour or more, for half of the change to completed.

Similarly, with respect to the FCC unit 10, it is contemplated that the response time to reach half way (i.e., 50% of a difference) between a new (or target) hydrocarbon partial pressure within the FCC unit 10 and an original (or stating) hydrocarbon partial pressure within the FCC unit 10, when the new (or target) hydrocarbon partial pressure differs from the original (or stating) hydrocarbon partial pressure by at least 10%, is also at least one second, at least ten seconds, at least one minute, at least ten minutes, or an hour or more. One of ordinary skill in the art will be able to determine the process conditions and response time for the dynamic processes associated with the present invention.

Thus, if slow control response of the turbine is an issue then the use of the turbine is limited to slow responding or "loose" control point applications. A slow responding application is contemplated to have a response time to reach half way (i.e., 50% of a difference) between a new (or target) steady state condition (e.g., temperature, pressure, flow rate) from an original (or starting) steady state condition when the new (or target) condition differs from the original (or stating) condition of at least 10%, is of at least one second, or even greater, for example, ten seconds, at least one minute, at least ten minutes, or an hour or more, for half of the change to completed.

It is further contemplated that the chemical processing units used in the present processes, such as the FCC unit 10 or the hydrotreating reactor 100, utilizes a process control system.

The process control system described in connection with the embodiments disclosed herein may be implemented or performed on the computer with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, the processor may be any conventional processor, controller, microcontroller, or state machine. A processor may also be a combination of computing devices, e.g., a combination of a DSP and a microprocessor, two or more microprocessors, or any other combination of the foregoing.

The steps of the processes associated with the process control system may be embodied in an algorithm contained directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is in communication with the processor reading information from, and writing information to, the storage medium. This includes the storage medium being integral to or with the processor. The processor and the storage medium may reside in an ASIC. The ASIC may reside in a user terminal. Alternatively, the processor and the storage medium may reside as discrete components in a user terminal. These devices are merely intended to be exemplary, non-limiting examples of a computer readable storage medium. The processor and storage medium or memory are also typically in communication with hardware (e.g., ports, interfaces, antennas, amplifiers, signal processors, etc.) that allow for wired or wireless communication between different components, computers processors, or the like, such as between the input channel, a processor of the control logic, the output channels within the control system and the operator station in the control center.

In communication relative to computers and processors refers to the ability to transmit and receive information or data. The transmission of the data or information can be a wireless transmission (for example by Wi-Fi or Bluetooth) or a wired transmission (for example using an Ethernet RJ45 cable or an USB cable). For a wireless transmission, a wireless transceiver (for example a Wi-Fi transceiver) is in communication with each processor or computer. The transmission can be performed automatically, at the request of the computers, in response to a request from a computer, or in other ways. Data can be pushed, pulled, fetched, etc., in any combination, or transmitted and received in any other manner.

According to the present invention, therefore, it is contemplated that the process control system receives information relative to an amount of electricity generated by the turbines 60. It is contemplated that the turbine determines the amount of electricity it has generated, or alternatively, the process control system receiving the information determines the amount of electricity that has been generated. In either configuration, the amount of the electricity generated by the turbines 60 is displayed on at least one display screen 80 (for example in communication with the computer 76 in the control center 78). If the processing unit comprises a plurality of turbines 60, it is further contemplated that the processing control system receives information associated with the amount of electricity generated by each of the turbines 60. The processing control system determines a total power generated based upon the information associated with the each of the turbines 60 and displays that the total power generated. The total power generated may be displayed instead of or in conjunction with the display of the power generated by individual turbines 60.

As discussed above, the recovery of the electricity is based upon the need to remove energy form the streams that has already been added to the streams in the processing units. Thus, it is contemplated that the processes according to the present invention provide for the various process conditions associated with the processing units to be adjusted into order to lower the energy added to the steam initially. It is contemplated that the process control system receives information associated with the throughput of the processing unit, and determines a target power generated value for the turbines 60, since the electricity represents energy that is typically added to the overall processing unit.

The determination of the target power generated value may be done when the electricity is at or near a predetermined level. Thus, the process control system will analyze one or more changes to the various process conditions associated with the processing unit to lower the amount of energy recovered by the turbines 60. Preferably, the process conditions are adjusted without adjusting the throughput of the processing unit. This allows for the processing unit to have the same output, but with a lower operating input. The process control software may calculate and display the difference between the target power generated value and the total power generated on the at least one display screen 80.

EXAMPLES

In simulated examples of the present invention, it was determined that by using a turbine 60 instead of a control valve, the quench temperature for a hydroprocessing reactor could be reduced by 5-10° C. It is believed that this could reduce the hydrogen demand requirements for the quench stream by up to 5% or alternatively debottleneck the hydrocarbon feed rate by a similar amount. Another option would be to use this reduction in the quench hydrogen demand to shift hydrogen to the reactor inlet. Additionally, or alternatively, the reduction in the quench hydrogen demand reduces the power consumption of the recycle gas compressor used in association the hydrogen containing gas stream. For an FCC unit, it was determined that by using a turbine 60 instead of a control valve, the catalyst to oil (feedstock) ratio could be increased with an increase in yield (as opposed to increase in undesired byproducts) which increases the profitability of the FCC unit or allow for more feed while maintaining a constant catalyst to oil ratio.

Thus, not only does the present invention recover energy that is typically lost, the present invention provides advantages to the underlying process conditions of the processing unit.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

SPECIFIC EMBODIMENTS

While the following is described in conjunction with specific embodiments, it will be understood that this description is intended to illustrate and not limit the scope of the preceding description and the appended claims.

A first embodiment of the invention is a process for reducing pressure of a vapor stream used for reducing a temperature, heat load, or hydrocarbon partial pressure in a reactor, the process comprising reducing a pressure of a vapor stream with a turbine to provide a lower pressure vapor stream; rotating a turbine wheel within the turbine, injecting the lower pressure vapor stream into a reactor and reducing a temperature in the reactor or reducing a partial pressure of a hydrocarbon vapor in the reactor. An embodiment of the invention is one, any or all of prior embodiments in this paragraph up through the first embodiment in this paragraph further comprising increasing the feed rate to the reactor by relaxing a high temperature bottleneck by extracting energy from the vapor stream. An embodiment of the invention is one, any or all of prior embodiments in this paragraph up through the first embodiment in this paragraph wherein the turbine wheel is configured to transmit rotational movement to an electrical generator, and the process further comprising generating electricity with the turbine. An embodiment of the invention is one, any or all of prior embodiments in this paragraph up through the first embodiment in this paragraph further comprising receiving information from the turbine relative to an amount of electricity generated by the turbine; and, displaying the amount of electricity generated by the turbine on at least one display screen. An embodiment of the invention is one, any or all of prior embodiments in this paragraph up through the first embodiment in this paragraph further comprising maintaining a throughput of the reactor while adjusting at least one process parameter of the reactor. An embodiment of the invention is one, any or all of prior embodiments in this paragraph up through the first embodiment in this paragraph, wherein the reactor comprises a plurality of turbines each configured to generate electricity, and wherein the process comprises determining a total power generated based upon the amount of electricity generated by the turbines; and, displaying the total power generated value on the at least one display screen. An embodiment of the invention is one, any or all of prior embodiments in this paragraph up through the first embodiment in this paragraph wherein the reactor comprises an FCC reactor, and wherein the vapor stream comprises a steam stream. An embodiment of the invention is one, any or all of prior embodiments in this paragraph up through the first embodiment in this paragraph wherein the reactor comprises a hydroprocessing reactor, and wherein the vapor stream comprises a hydrogen stream.

A second embodiment of the invention is a process for reducing pressure of a vapor stream used for adjusting a partial pressure of a hydrocarbon vapor, the process comprising providing a vapor stream comprising steam; passing the vapor stream through a turbine, the turbine comprising a turbine wheel within the turbine; and, reducing a partial pressure of a hydrocarbon vapor by mixing the reduced pressure vapor stream with the hydrocarbon vapor. An embodiment of the invention is one, any or all of prior embodiments in this paragraph up through the second embodiment in this paragraph, wherein the reduced pressure vapor stream is injected into an FCC reactor to reduce the partial pressure of the hydrocarbon vapor in the FCC reactor. An embodiment of the invention is one, any or all of prior embodiments in this paragraph up through the second embodiment in this paragraph further comprising recovering electricity generated with the turbine. An embodiment of the invention is one, any or all of prior embodiments in this paragraph up through the second embodiment in this paragraph further comprising adjusting one or more process conditions for the FCC reactor based upon a cooling duty provided by the turbine. An embodiment of the invention is one, any or all of prior embodiments in this paragraph up through the second embodiment in this paragraph, wherein the outlet temperature is within 15 degrees C. of the dew point of the reduced pressure vapor stream. An embodiment of the invention is one, any or all of prior embodiments in this paragraph up through the second embodiment in this paragraph, wherein a response time to reach 50% of a difference between the partial pressure and an original partial pressure, when the partial pressure varies from the original partial pressure by at least 10%, is at least one second. An embodiment of the invention is one, any or all of prior embodiments in this paragraph up through the second embodiment in this paragraph, wherein a change response time to reach 50% of a difference between the partial pressure and an original partial pressure, when the partial pressure varies from the original partial pressure by at least 10%, is at least ten seconds.

A third embodiment of the invention is a process for reducing pressure of a vapor stream used as a quench stream, the process comprising providing a vapor stream comprising hydrogen; passing the vapor stream through a turbine, the turbine comprising a turbine wheel within the turbine; recovering a reduced pressure vapor stream from the turbine; and, controlling a temperature within a reactor with the reduced pressure vapor stream from the turbine. An embodiment of the invention is one, any or all of prior embodiments in this paragraph up through the third embodiment in this paragraph wherein the reactor comprises a hydroprocessing reactor. An embodiment of the invention is one, any or all of prior embodiments in this paragraph up through the third embodiment in this paragraph further comprising determining a cooling duty of the turbine; and, adjusting one or more process conditions for the hydroprocessing reactor based upon the cooling duty of the turbine. An embodiment of the invention is one, any or all of prior embodiments in this paragraph up through the third embodiment in this paragraph further comprising adjusting a process condition of the vapor stream to achieve a desired hydroprocessing reactor temperature. An embodiment of the invention is one, any or all of prior embodiments in this paragraph up through the third embodiment in this paragraph, wherein the reduced pressure vapor stream is injected into the reactor to adjust a temperature of at least one catalyst bed. An embodiment of the invention is one, any or all of prior embodiments in this paragraph up through the third embodiment in this paragraph, wherein a response time to reach 50% of a difference between the temperature within the reactor and an original temperature within the reactor, when the temperature within the reactor varies from the original temperature within the reactor by at least 10%, is at least one second. An embodiment of the invention is one, any or all of prior embodiments in this paragraph up through the third embodiment in this paragraph, wherein a response time to reach 50% of a difference between the temperature within the reactor and an original temperature within the reactor, when the temperature within the reactor varies from the original temperature within the reactor by at least 10%, is at least ten seconds. An embodiment of the invention is one, any or all of prior embodiments in this paragraph up through the third embodiment in this paragraph further comprising recovering electricity generated with the turbine.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process comprising:
reducing pressure of a vapor stream used for adjusting a partial pressure of a hydrocarbon vapor in an FCC reactor by:
providing the vapor stream, wherein the vapor stream comprises steam;
passing the vapor stream through a turbine to provide a reduced pressure vapor stream, the turbine comprising a turbine wheel within the turbine, wherein a temperature of the reduced pressure vapor stream at an outlet of the turbine is within 15° C. of the dew point of the reduced pressure vapor stream;
reducing the partial pressure of the hydrocarbon vapor by mixing the reduced pressure vapor stream with the hydrocarbon vapor; and
modulating a resistance of the turbine to adjust at least one steady state process condition to a new steady state process condition of at least 10% difference, wherein a response time to reach 50% of the difference between the at least one steady state process condition and the new steady state process condition after modulating the resistance of the turbine is at least one second.

2. The process of claim 1 further comprising:
recovering electricity generated with the turbine.

3. The process of claim 2 further comprising:
adjusting one or more process conditions for the FCC reactor based upon a cooling duty provided by the turbine.

4. The process of claim 1, wherein the response time to reach 50% of the difference between the at least one steady state process condition and the new steady state process condition after modulating the resistance of the turbine is at least ten seconds.

* * * * *